(12) United States Patent
Ding et al.

(10) Patent No.: US 11,718,182 B2
(45) Date of Patent: Aug. 8, 2023

(54) RAILWAY VEHICLE WITH AERODYNAMIC LIFT CONTROL DEVICE

(71) Applicant: CRRC QINGDAO SIFANG CO., LTD., Shandong (CN)

(72) Inventors: Sansan Ding, Shandong (CN); Shuanbao Yao, Shandong (CN); Dawei Chen, Shandong (CN); Shaoqing Liu, Shandong (CN); Fujie Jiang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 17/788,763

(22) PCT Filed: May 18, 2020

(86) PCT No.: PCT/CN2020/090779
§ 371 (c)(1),
(2) Date: Jun. 24, 2022

(87) PCT Pub. No.: WO2021/135042
PCT Pub. Date: Jul. 8, 2021

(65) Prior Publication Data
US 2023/0031854 A1    Feb. 2, 2023

(30) Foreign Application Priority Data
Jan. 2, 2020 (CN) .......................... 202010001729.6

(51) Int. Cl.
*B60L 13/06* (2006.01)
*B61B 13/08* (2006.01)

(52) U.S. Cl.
CPC .............. *B60L 13/06* (2013.01); *B61B 13/08* (2013.01); *B60L 2200/26* (2013.01)

(58) Field of Classification Search
CPC ...... B61B 13/08; B60L 13/06; B60L 2200/26; B60V 3/04
See application file for complete search history.

(56) References Cited

U.S. PATENT DOCUMENTS 3,333,550 A * 8/1967 Gorham ................. B61B 13/08
                                                                104/120
4,969,401 A * 11/1990 Kolm ..................... B60L 13/06
                                                                104/295

(Continued)

FOREIGN PATENT DOCUMENTS

CN       201033564 Y      3/2008
CN       102358305 A  *   2/2012

(Continued)

OTHER PUBLICATIONS

International Search Report for PCT/CN2020/090779 dated Oct. 13, 2020, ISA/CN.

(Continued)

*Primary Examiner* — Zachary L Kuhfuss
(74) *Attorney, Agent, or Firm* — Yue (Robert) Xu; Apex Attorneys at Law, LLP

(57) ABSTRACT

A railway vehicle with an aerodynamic lift control device is disclosed. An equipment compartment is formed between a vehicle body bottom plate at the bottom of a vehicle body and a passenger room floor, and the aerodynamic lift control device is provided in the equipment compartment; the aerodynamic lift control device comprises an aerodynamic lift regulation fan and aerodynamic lift air ducts, and an aerodynamic lift regulation air port located within the aerodynamic lift control range is formed in the vehicle body bottom plate; one end of each aerodynamic lift regulating air duct communicates with the aerodynamic lift regulation air port, and the other end communicates with the aerodynamic lift regulating fan; and the aerodynamic lift regulation fan (Continued)

changes the pressure distribution form of the bottom of the train by blowing positive pressure airflow or sucking negative pressure airflow.

11 Claims, 3 Drawing Sheets

(56) References Cited

U.S. PATENT DOCUMENTS

| | | | | |
|---|---|---|---|---|
| 5,170,715 | A * | 12/1992 | Gran | B60L 13/06 104/23.1 |
| 2005/0139115 | A1 * | 6/2005 | Harada | B61D 17/02 105/1.1 |
| 2019/0283782 | A1 * | 9/2019 | Liu | B61H 9/006 |

FOREIGN PATENT DOCUMENTS

| | | | |
|---|---|---|---|
| CN | 103085805 | A | 5/2013 |
| CN | 103395418 | A | 11/2013 |
| CN | 103661420 | A | 3/2014 |
| CN | 105480317 | A | 4/2016 |
| CN | 107399315 | A | 11/2017 |
| CN | 107776586 | A | 3/2018 |
| CN | 108622067 | A | 10/2018 |
| CN | 109969210 | A * | 7/2019 |
| CN | 110386155 | A | 10/2019 |
| CN | 110435394 | A | 11/2019 |
| CN | 111038272 | A | 4/2020 |
| FR | 3092543 | A1 * | 8/2020 |
| GB | 1505839 | A | 3/1978 |
| JP | S5232481 | U | 3/1977 |
| JP | S5321569 | A | 2/1978 |
| JP | H08133076 | A | 5/1996 |
| JP | H1179333 | A | 3/1999 |
| JP | 2003285734 | A | 10/2003 |
| JP | 2004-249788 | A | 9/2004 |

OTHER PUBLICATIONS

First Office Action dated Dec. 12, 2022 for Japanese patent application No. 2022-539039, English translation provided by Global Dossier.

* cited by examiner

RAILWAY VEHICLE WITH AERODYNAMIC LIFT CONTROL DEVICE

The present disclosure is a national phase application of PCT international patent application PCT/CN2020/090779, filed on May 18, 2020 which claims the priority to Chinese Patent Application No. 202010001729.6, titled "RAILWAY VEHICLE WITH AERODYNAMIC LIFT CONTROL DEVICE", filed with the China National Intellectual Property Administration on Jan. 2, 2020, which is incorporated herein by reference in its entirety.

FIELD

The present disclosure relates to the technical field of railway vehicles, and in particular to a railway vehicle with an aerodynamic control device.

BACKGROUND

A maglev train is a train driven by magnetic levitation force (that is, magnetic attraction force and repulsion force). The maglev train is levitated in the air due to the magnetic force of a track thereof, and the maglev train has a levitation gap about 10 mm from the track, so that the maglev train is only subjected to the resistance from the air, the speed of which can reach more than 500 kilometers per hour, and thus the maglev train is the fastest ground passenger transport vehicle today and has the advantages of high speed, strong climbing ability, low energy consumption, low noise, safety and comfort, and less pollution during operation.

The aerodynamic lift of the maglev train has a great impact on a levitation control system and an operation safety of the train. Generally, the higher the running speed of the train is, the greater the aerodynamic lift is. Appropriately increasing or decreasing the aerodynamic lift of each compartment is one of the key issues to be solved in the process of train design. The design of train first shape and body smoothness is an effective way to improve the aerodynamic lift of the train, but the design is difficult, has a long cycle and a high cost.

CN103085805A discloses a new-type ultra-high speed train using ground effect aerodynamic levitation and electromagnetic propulsion, a bottom of which becomes a continuous and smooth constricted curved surface by aerodynamically modifying the bottom of the existing maglev train, the constricted curved surface and a surface of the track together form a constricted airflow passage which has a largest cross-sectional area at an entrance of a first compartment and has a smallest cross-sectional area at an exit of a last compartment. This maglev train is levitated by using the aerodynamic lift generated by the ground effect to replace the electromagnetic force, which not only retains the advantages of small resistance and high speed of the conventional maglev train, but also improves the power consumption of electromagnetic levitation, and reduces the weight of on-board superconducting related equipment. Therefore, the energy consumption of the train during ultra-high speed operation is reduced, and the transportation efficiency is improved.

CN103395418A discloses an ultra-high speed maglev train with aerodynamic levitation with an air inlet on two sides and an electromagnetic propulsion, the air inlets are provided on both a left side surface and a right side surface of each compartment in the maglev train. In addition, a bottom surface of each compartment is aerodynamically modified to form a compartment bottom surface with two air inlet passages. The two air inlet passages are both positioned along an axial direction of the compartment and are located on a left and right sides of the compartment bottom surface; front ends of the two air inlet passages are in communication with the air inlets, and both the two air inlet passages are tapered from front to back. Therefore, when the maglev train is moving at high speed, the incoming flow respectively enters the left air inlet passage and the right air inlet passage from the air inlets on the left and right side walls of the compartment, and decelerates and supercharges in the left air inlet passage and the right air inlet passage to form a high pressure zone, so as to generate an upward lifting force on the compartment, which not only retains the advantages of small resistance and high speed of the conventional maglev train, but also reduces the energy consumption of the train during ultra-high speed operation and improves the transportation efficiency.

CN108622067A discloses an aerodynamically-guided air cushion levitation railway train, which produces a levitation effect by using high pressure air as air cushion, and is guided by using the lateral component force generated by the air cushion, and includes an air cushion generation system, a linear motor drive system, a vehicle body supporting assembly and a vehicle body. The linear motor may be used for regenerative braking, plug braking or dynamic braking, and the aerodynamically-guided air cushion levitation railway train may be provided with a linear magnetic retarder for braking. When an armature winding of the linear motor of the aerodynamically-guided air cushion levitation railway train to be connected to an external power supply is arranged on the vehicle body, a pantograph must be provided on the vehicle body to be connected to an external power transmission line. When the armature winding of the linear motor to be connected to the external power supply is arranged on the track, the power can be supplied in sections. The aerodynamically-guided air cushion levitation railway train can be designed to meet the requirements of freight or passenger transport.

The above types of maglev trains all realize the levitation of the train or the guiding control of the train by using the aerodynamic lift of the train, but the use of the aerodynamic lift are all relatively rough. After the train is put into use, the aerodynamic lift at different speeds is fixed, and it is impossible to actively and precisely control the aerodynamic lift accruing to the actual operating conditions of the train.

SUMMARY

An object according to the present disclosure is to provide a railway vehicle with an aerodynamic lift control device. A pressure distribution at the bottom of the train is improved by mounting a bottom air blowing and sucking device according to the characteristics of a flow field at the bottom of the train, so that active and precise control of aerodynamic lift received by the train is realized.

In order to achieve the above object, a railway vehicle with an aerodynamic lift control device is provided according to the present disclosure, which includes a vehicle body and a travelling mechanism arranged at a bottom of the vehicle body, an equipment compartment is formed between a vehicle body bottom floor at the bottom of the vehicle body and a passenger room floor, and the aerodynamic lift control device is provided in the equipment compartment; the aerodynamic lift control device includes an aerodynamic lift regulation air blower and aerodynamic lift regulation air ducts, aerodynamic lift regulation air ports are provided in the vehicle body bottom floor within an aerodynamic lift control range; one end of each aerodynamic lift regulation air duct is in communication with the corresponding aerodynamic lift regulation air port, the other end of each aerodynamic lift regulation air duct is in communication with the aerodynamic lift regulation air blower; a positive pressure airflow is blown from the aerodynamic lift regulation air ports to a gap between the bottom of the vehicle body and a rail surface through the aerodynamic lift regulation air ducts when the aerodynamic lift regulation air blower is in a positive pressure working state, a negative pressure airflow is sucked from the gap between the bottom of the vehicle body and the rail surface through the aerodynamic lift regulation air ducts and the aerodynamic lift regulation air ports when the aerodynamic lift regulation air blower is in a negative pressure working state, and a pressure distribution at the bottom of the railway vehicle is changed by blowing the positive pressure airflow or sucking the negative pressure airflow.

Preferably, the aerodynamic lift regulation air ports are spaced apart along a longitudinal centerline direction on the vehicle body bottom floor, at least part of the aerodynamic lift regulation air ports are close to a front end of the vehicle body bottom floor, and at least another part of the aerodynamic lift regulation air ports are close to a rear end of the vehicle body bottom floor.

Preferably, the aerodynamic lift regulation air ports are symmetrically distributed about a longitudinal centerline on the vehicle body bottom floor, the aerodynamic lift regulation air ports on each side are spaced apart in a longitudinal direction, at least part of the aerodynamic lift regulation air ports are close to a front end of the vehicle body bottom floor, and at least another part of the aerodynamic lift regulation air ports are close to a rear end of the vehicle body bottom floor.

Preferably, the aerodynamic lift regulation air blower is a variable frequency air blower or a fixed frequency air blower, an air port baffle for regulating an air inlet area of the aerodynamic lift regulation air port is provided at each aerodynamic lift regulation air port, which cooperates with the aerodynamic lift regulation air blower to regulate an air volume and an air velocity of the positive pressure airflow or the negative pressure airflow.

Preferably, a filter screen device is mounted at each aerodynamic lift regulation air port, to prevent debris on a track from entering the aerodynamic lift regulation air duct.

Preferably, a control device of the aerodynamic lift regulation air blower is connected to a vehicle control system so as to remotely control an air volume and an air velocity of the aerodynamic lift regulation air blower.

Preferably, an air port of each aerodynamic lift regulation air duct is in splicing connection with the corresponding aerodynamic lift regulation air port.

Preferably, the air port of each aerodynamic lift regulation air duct is in splicing connection with the aerodynamic lift regulation air port by a bolt or a rivet.

Preferably, the aerodynamic lift regulation air port include a first air port close to a front end of the vehicle body and a second air port close to a rear end of the vehicle body, the aerodynamic lift regulation air blower is substantially arranged in the middle of the vehicle body, the aerodynamic lift regulation air ducts include a first air duct located on a front side of the aerodynamic lift regulation air blower and a second air duct located on a rear side of the aerodynamic lift regulation air blower, the first air port is in communication with the aerodynamic lift regulation air blower through the first air duct, and the second air port is in communication with the aerodynamic lift regulation air blower through the second air duct.

Preferably, the railway vehicle includes multiple compartments, and the aerodynamic lift control device is provided in a first compartment and/or a last compartment.

Preferably, the railway vehicle is a maglev train.

The railway vehicle with the aerodynamic lift control device is provided according to the present disclosure, the aerodynamic lift regulation air blower thereof can blow airflow in positive pressure or suck airflow to form negative pressure from the aerodynamic lift regulation air ports to the gap between the bottom of the vehicle body and the rail surface through the aerodynamic lift regulation air ducts, so as to improve the pressure distribution at the bottom of the train, and further precisely control the aerodynamic lift of the train. The aerodynamic lift applying to the train can be quantitatively controlled during high speed operation by adjusting the blown or sucked air volume and the position of the air ports, so that the train can operate more stably, reliably, safely and with low energy-consumption. Moreover, the aerodynamic lift control device has a simple structure and is easy to manufacture and mount, can be used in different types of railway vehicles, such as an EMU or a high speed rail, especially a maglev vehicle.

Figure 1:
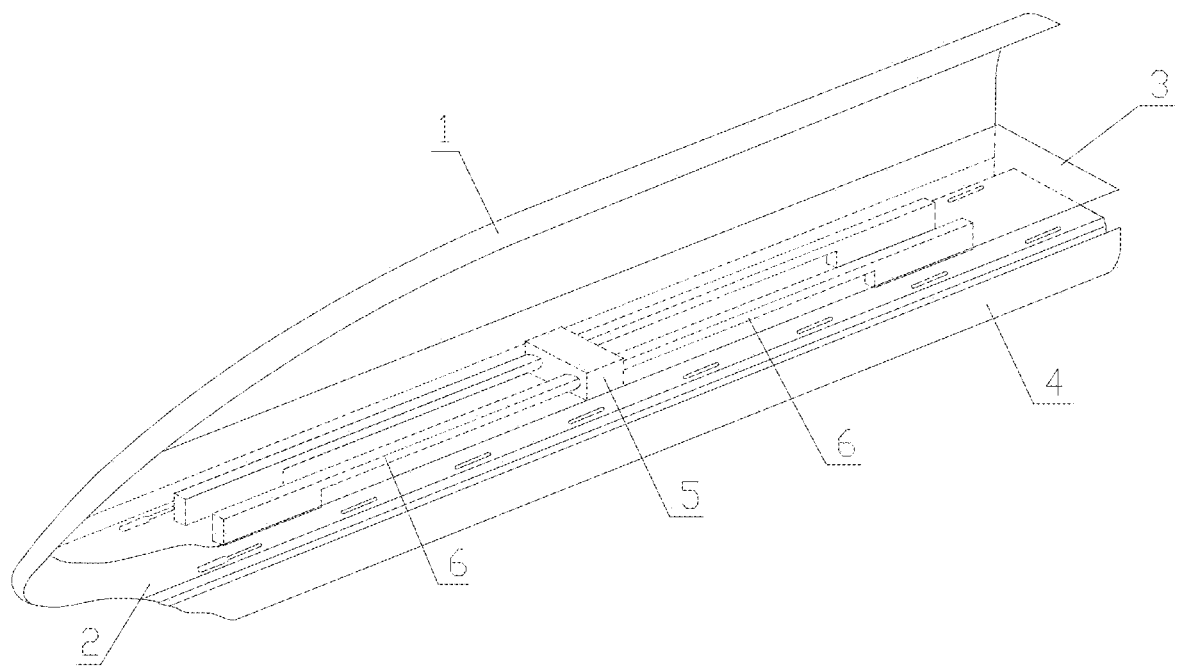
FIG. 1 is a schematic structural view of a maglev train with an aerodynamic lift control device provided according to an embodiment of the present disclosure.

Reference numerals are as follows:
1 vehicle body;
2 vehicle body bottom floor;
3 passenger room floor;
4 equipment compartment;
5 aerodynamic lift regulation air blower;
6 aerodynamic lift regulation air duct;
6-1 first air duct;
6-2 second air duct;
7 aerodynamic lift regulation air port;
7-1 first air port;
7-2 second air port.

DETAILED DESCRIPTION OF THE EMBODIMENTS

In order to enable those skilled in the art to better understand the technical solutions of the present application, the present application will be further described in detail with reference to the drawings and specific embodiments.

Herein, terms such as "up, down, left, right" are established based on the positional relationship shown in the accompanying drawings, and the corresponding positional relationship may also change according to the different accompanying drawings. Therefore, it should not be construed as an absolute limitation on the scope of the protection. In addition, relational terms such as "first" and "second" are only used to distinguish one element from another with the same name, and do not necessarily require or imply any such actual relationship or order between these elements.

Figure 2:
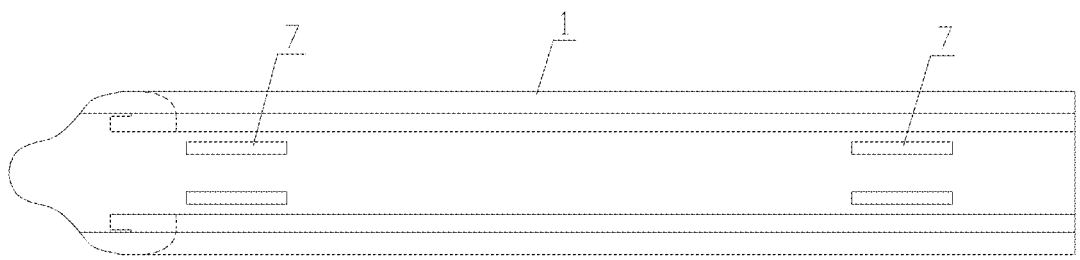
FIG. 2 is a schematic view of a bottom of the maglev train with the aerodynamic lift control device provided according to the embodiment of the present disclosure shown in FIG. 1.
Figure 3:
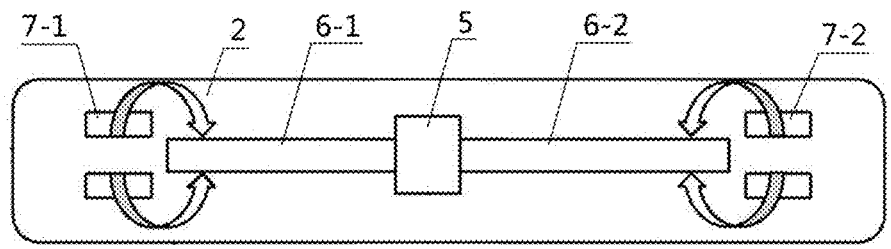
FIG. 3 is a schematic structural view of the aerodynamic lift control device shown in FIG. 1.

Referring to FIG. 1, FIG. 2 and FIG. 3, FIG. 1 is a schematic structural view of a maglev train with an aerodynamic lift control device provided according to an embodiment of the present disclosure; FIG. 2 is a schematic view of a bottom of the maglev train with the aerodynamic lift control device provided according to the embodiment of the present disclosure shown in FIG. 1; and FIG. 3 is a schematic structural view of the aerodynamic lift control device shown in FIG. 1.

As shown in the figure, in a specific embodiment, taking the maglev train as an example, the structure make-up and the working principle of the aerodynamic lift control device are described. For those skilled in the art, it can be understood that the aerodynamic lift control device can be used in other railway vehicles such as an EMU (Electric Multiple-Unit Car) or a high speed train.

The maglev train provided according to the present disclosure is configured to operate on a magnetic levitation track and has multiple compartments. Each compartment is mainly composed of a vehicle body 1 and a magnetic levitation mechanism and a magnetic propulsion mechanism (belonging to the conventional technology, not shown in the figure) which are arranged at a bottom of the vehicle body, and can cooperate with the magnetic levitation track, so that the train can be levitated by the magnetic force and propelled forward by the magnetic force. The bottom of the vehicle body 1 includes a vehicle body bottom floor 2 and a passenger room floor 3, and an equipment compartment 4 for mounting an outboard equipment is formed between the vehicle body bottom floor 2 and the passenger room floor 3. In addition, the aerodynamic lift control device is provided in the equipment compartments 4 of the first compartment and the last compartment.

Taking the first compartment as an example, its aerodynamic lift control device mainly consists of an aerodynamic lift regulation air blower 5 and aerodynamic lift regulation air ducts 6, aerodynamic lift regulation air ports 7 are provided on the vehicle body bottom floor 2, the aerodynamic lift regulation air ports 7 shown in the figures is rectangular with the number of four, and are symmetrically distributed about a longitudinal centerline in the vehicle body bottom floor 2, where the two aerodynamic lift regulation air ports 7 on each side are spaced apart in a longitudinal direction. Two of aerodynamic lift regulation air ports 7 are first air ports 7-1, which are close to a front end of the vehicle body bottom floor 2, and the other two of the four aerodynamic lift regulation air ports 7 are second air ports 7-2, which are close to a rear end of the vehicle body bottom floor 2. All aerodynamic lift regulation air ports 7 are located within a range required to be under an aerodynamic lift control.

One end of each aerodynamic lift regulation air duct 6 is in communication with the corresponding aerodynamic lift regulation air port 7, another end of each aerodynamic lift regulation air duct 6 is in communication with the aerodynamic lift regulation air blower 5, the aerodynamic lift regulation air blower 5 is substantially arranged in the middle of the equipment compartments 4, the aerodynamic lift regulation air ducts 6 include a first air duct 6-1 located on a front side of the aerodynamic lift regulation air blower 5 and a second air duct 6-2 located on a rear side of the aerodynamic lift regulation air blower 5, the first air port 7-1 is in communication with the aerodynamic lift regulation air blower 5 through the first air duct 6-1, and the second air port 7-2 is in communication with the aerodynamic lift regulation air blower 5 through the second air duct 6-2, so as to realize the closed-loop mounting of the aerodynamic lift control device.

Specifically, an air port of each aerodynamic lift regulation air duct 6 is in splicing connection with the aerodynamic lift regulation air port 7 by a bolt or a rivet.

A positive pressure airflow is blown from the aerodynamic lift regulation air ports 7 to a gap between the bottom of the vehicle body 1 and a rail surface through the aerodynamic lift regulation air ducts 6 when the aerodynamic lift regulation air blower 5 is in a positive pressure working state, and a negative pressure airflow is sucked from the gap between the bottom of the vehicle body 1 and the rail surface through the aerodynamic lift regulation air ducts 6 and the aerodynamic lift regulation air ports 7 when the aerodynamic lift regulation air blower 5 is in a negative pressure working state. A pressure distribution at the bottom of the rail vehicle varies in case of blowing the positive pressure airflow or sucking the negative pressure airflow.

A position and a size of the aerodynamic lift regulation air ports 7 can be configured according to specific design requirements (including the aerodynamic lift control range, strength of the bottom floor and space requirement), and the aerodynamic lift regulation air blower 5 may a variable frequency air blower. The amount of the air volume can be precisely controlled by using the variable frequency air blower, so as to further precisely control the amount of the aerodynamic lift.

In other embodiments, when the air ports need to be manufactured in the vehicle body bottom floor 2, an air port baffle for regulating an air inlet area of the aerodynamic lift regulation air port is provided at each aerodynamic lift regulation air port 7, to cooperate with the aerodynamic lift regulation air blower 5 in order to regulate an air volume and an air velocity of the positive pressure airflow or the negative pressure airflow. If the aerodynamic lift regulation air blower 5 is a fixed frequency air blower, the area of the aerodynamic lift regulation air port 7 can be regulated by the air port baffle in order to regulate the air velocity at the aerodynamic lift regulation air port 7.

In addition, a filter screen device is mounted at each aerodynamic lift regulation air port 7 to prevent debris on a track from entering the aerodynamic lift regulation air duct 6, so as to avoid the hidden danger of blocking the aerodynamic lift regulation air duct 6 and even damaging the aerodynamic lift regulation air blower 5.

A control device of the aerodynamic lift regulation air blower 5 is connected to a vehicle control system so as to remotely control an air volume and an air velocity of the aerodynamic lift regulation air blower 5.

In at least one embodiment, the aerodynamic lift regulation air ports 7 are spaced apart along a longitudinal centerline direction on the vehicle body bottom floor 2, at least part of the aerodynamic lift regulation air ports are close to a front end of the vehicle body bottom floor 2, and at least another part of the aerodynamic lift regulation air ports are close to a rear end of the vehicle body bottom floor 2.

Alternatively, the aerodynamic lift regulation air ports 7 may be distributed on the vehicle body bottom floor 2 in other ways, such as in a rectangular array or an annular array, etc. A valve may be further provided in the aerodynamic lift regulation air duct 6, so as to selectively make different aerodynamic lift regulation air ports 7 in operation according to actual needs during use, that is, a part of the aerodynamic lift regulation air ports 7 is in a working state, and the other part of the aerodynamic lift regulation air ports 7 is in a non-working state.

The above embodiments are only preferred solutions of the present disclosure, and the present disclosure is not specifically limited thereto. On this basis, targeted adjustments can be made according to actual needs, thereby obtaining different embodiments. For example, the air port of each aerodynamic lift regulation air duct 6 is in splicing connection with the aerodynamic lift regulation air port 7 in other ways; or, the aerodynamic lift regulation air ports 7 may be configured into other shapes. Since there are many implementations, no more examples are taken and illustrated here.

In practice, the position, shape and size of the aerodynamic lift regulation air ports 7 and the regulation range of the air volume of the aerodynamic lift regulation air blower 5 and the corresponding type of the air blower can be determined according to the design requirements (including vehicle limit requirement, aerodynamic lift control range, etc.). During vehicle design, the shape, size and layout method of the aerodynamic lift regulation air ducts 6 are determined according to the spatial layout of the equipment compartment of the vehicle, the corresponding relationship between the air volume and the aerodynamic lift can be determined by simulation calculation or actual vehicle test method, and the air volume can be regulated according to the control requirement of the aerodynamic lift.

Figure 4:
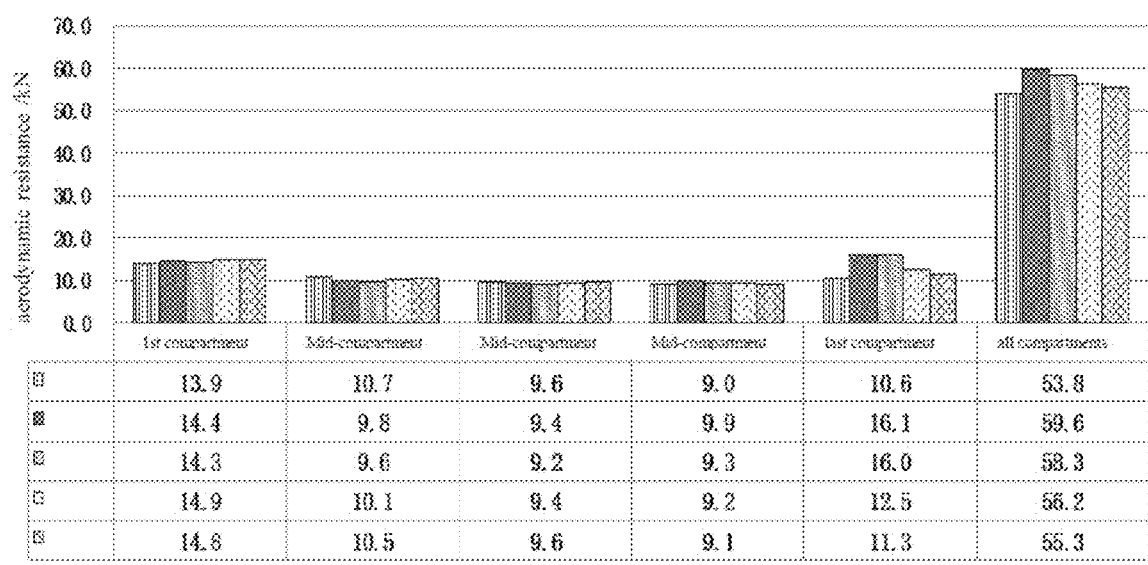
FIG. 4 is a graph showing test data of air resistance of the maglev train.

FIG. 4 shows the aerodynamic resistance of each compartment when the maglev train is operating at 600 km/h after the aerodynamic lift control device is mounted in the first compartment and the last compartment of the train, where an intake air volume of air volume I is eight times of an intake air volume of air volume IV. It can be seen that after the aerodynamic lift control device is mounted, the impact on the aerodynamic resistance of each compartment is relatively small, and the aerodynamic resistance of air volume I is the largest, which is about 10.8% higher than the aerodynamic resistance when the aerodynamic lift control device is not mounted.

Figure 5:
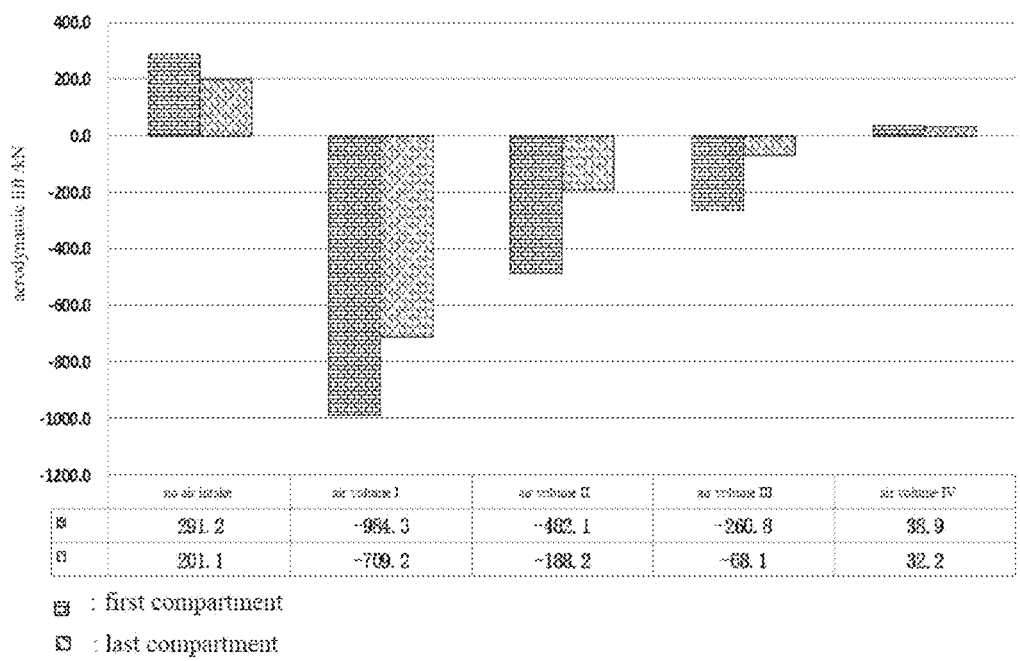
FIG. 5 is a graph showing test data of aerodynamic lift of the maglev train.

FIG. 5 shows the aerodynamic lift of each compartment when the maglev train is running at 600 km/h after the aerodynamic lift control device is mounted in the first compartment and the last compartment of the train. It can be seen that the aerodynamic lift of the first compartment and the last compartment vary as the air volume varies, and the amplitude of variation is extremely large. The aerodynamic lift of the train can be precisely controlled by finely regulating the air volume.

It can be seen from the above test data, the mounting of the aerodynamic lift control device has a strong directivity on the impact on the aerodynamic performance of the train, that is, only changing the aerodynamic lift of the mounting portion has a relatively small impact on the aerodynamic resistance of the maglev train.

The present disclosure aims at to provide a precise control of the aerodynamic lift of the maglev train. The aerodynamic lift control device is mounted in the compartment that needs to control the aerodynamic lift of the train according to the specific design requirements, and the characteristics of a flow field between the bottom of the maglev train and a guideway is changed by using the aerodynamic lift control device, so as to change the pressure distribution of the bottom of the train.

In addition, the position and size of the aerodynamic lift regulation air ports 7 can be designed according to specific control requirements, the amount of the air volume can be regulated according to the control requirements of the aerodynamic lift, the design interface is flexible and changeable, and a reasonable interface method can be designed according to the actual size of the vehicle to meet the design requirements of different types of maglev trains, so that a new component can be quickly replaced when the air duct or the air blower fails, which facilitates maintenance and replacement. The design, manufacture and mounting of the present disclosure can be adapted to different types of maglev trains, and other structures of the maglev train can make reference to the conventional technology, which will not be repeated here.

The railway vehicle with the aerodynamic lift control device provided according to the present application has been described in detail above. The principle and the embodiments of the present aerodynamic lift are illustrated herein by specific examples. The above description of the examples is only intended to facilitate the understanding of the concept of the aerodynamic lift. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. A railway vehicle with an aerodynamic lift control device, comprising a vehicle body and a travelling mechanism arranged at a bottom of the vehicle body, wherein an equipment compartment is formed between a vehicle body bottom floor at the bottom of the vehicle body and a passenger room floor, and the aerodynamic lift control device is provided in the equipment compartment; the aerodynamic lift control device comprises an aerodynamic lift regulation air blower and aerodynamic lift regulation air ducts, aerodynamic lift regulation air ports are provided in the vehicle body bottom floor within an aerodynamic lift control range; one end of each aerodynamic lift regulation air duct is in communication with the corresponding aerodynamic lift regulation air port, the other end of each aerodynamic lift regulation air duct is in communication with the aerodynamic lift regulation air blower;

wherein the aerodynamic lift control device is configured such that:
a positive pressure airflow is blown from the aerodynamic lift regulation air ports to a gap between the bottom of the vehicle body and a rail surface through the aerodynamic lift regulation air ducts when the aerodynamic lift regulation air blower is in a positive pressure working state,
a negative pressure airflow is sucked from the gap between the bottom of the vehicle body and the rail surface through the aerodynamic lift regulation air ducts and the aerodynamic lift regulation air ports when the aerodynamic lift regulation air blower is in a negative pressure working state, and
a pressure distribution at the bottom of the railway vehicle is changed by blowing the positive pressure airflow or sucking the negative pressure airflow.

2. The railway vehicle with the aerodynamic lift control device according to claim 1, wherein the aerodynamic lift regulation air ports are spaced apart along a longitudinal centerline direction on the vehicle body bottom floor, at least part of the aerodynamic lift regulation air ports are close to a front end of the vehicle body bottom floor, and at least another part of the aerodynamic lift regulation air ports are close to a rear end of the vehicle body bottom floor.

3. The railway vehicle with the aerodynamic lift control device according to claim 1, wherein the aerodynamic lift regulation air ports are symmetrically distributed about a longitudinal centerline on the vehicle body bottom floor, the aerodynamic lift regulation air ports on each side are spaced apart in a longitudinal direction, at least part of the aerodynamic lift regulation air ports are close to a front end of the vehicle body bottom floor, and at least another part of the aerodynamic lift regulation air ports are close to a rear end of the vehicle body bottom floor.

4. The railway vehicle with the aerodynamic lift control device according to claim 1, wherein the aerodynamic lift regulation air blower is a variable frequency air blower or a fixed frequency air blower, an air port baffle for regulating an air inlet area of the aerodynamic lift regulation air port is provided at each aerodynamic lift regulation air port, which cooperates with the aerodynamic lift regulation air blower to regulate an air volume and an air velocity of the positive pressure airflow or the negative pressure airflow.

5. The railway vehicle with the aerodynamic lift control device according to claim 1, wherein a filter screen device is mounted at each aerodynamic lift regulation air port, to prevent debris on a track from entering the corresponding aerodynamic lift regulation air duct.

6. The railway vehicle with the aerodynamic lift control device according to claim 1, wherein a control device of the aerodynamic lift regulation air blower is connected to a vehicle control system so as to remotely control an air volume and an air velocity of the aerodynamic lift regulation air blower.

7. The railway vehicle with the aerodynamic lift control device according to claim 1, wherein an air port of each aerodynamic lift regulation air duct is in splicing connection with the aerodynamic lift regulation air port.

8. The railway vehicle with the aerodynamic lift control device according to claim 7, wherein the air port of each aerodynamic lift regulation air duct is in splicing connection with the aerodynamic lift regulation air port by a bolt or a rivet.

9. The railway vehicle with the aerodynamic lift control device according to claim 1, wherein the aerodynamic lift regulation air port comprise a first air port close to a front end of the vehicle body and a second air port close to a rear end of the vehicle body, the aerodynamic lift regulation air blower is substantially arranged in the middle of the vehicle body, the aerodynamic lift regulation air ducts comprise a first air duct located on a front side of the aerodynamic lift regulation air blower and a second air duct located on a rear side of the aerodynamic lift regulation air blower, the first air port is in communication with the aerodynamic lift regulation air blower through the first air duct, and the second air port is in communication with the aerodynamic lift regulation air blower through the second air duct.

10. The railway vehicle with the aerodynamic lift control device according to claim 1, comprising a plurality of compartments, wherein the aerodynamic lift control device is provided in a first compartment and/or a last compartment.

11. The railway vehicle with the aerodynamic lift control device according to claim 1, wherein the railway vehicle is a maglev train.

* * * * *